(12) United States Patent
Cardenas

(10) Patent No.: US 11,559,052 B2
(45) Date of Patent: Jan. 24, 2023

(54) LARGE ARBOR ICE FISHING TIP-UP SPOOL

(71) Applicant: Joseph Cardenas, Helena, MT (US)

(72) Inventor: Joseph Cardenas, Helena, MT (US)

( * ) Notice: Subject to any disclaimer, the term of this patent is extended or adjusted under 35 U.S.C. 154(b) by 0 days.

(21) Appl. No.: 17/322,872

(22) Filed: May 17, 2021

(65) Prior Publication Data

US 2021/0289762 A1 Sep. 23, 2021

Related U.S. Application Data

(60) Provisional application No. 62/991,245, filed on Mar. 18, 2020.

(51) Int. Cl.

| | |
|---|---|
| *A01K 89/01* | (2006.01) |
| *A01K 97/01* | (2006.01) |
| *A01K 89/015* | (2006.01) |
| *A01K 89/00* | (2006.01) |

(52) U.S. Cl.
CPC ............ *A01K 97/01* (2013.01); *A01K 89/006* (2013.01); *A01K 89/01925* (2015.05); *A01K 89/01931* (2015.05)

(58) Field of Classification Search
CPC .............. A01K 97/01; A01K 89/01925; A01K 89/01931; A01K 89/006; A01K 89/08; A01K 89/0111; A01K 89/016; B65H 75/28; B65H 65/00
See application file for complete search history.

(56) References Cited

U.S. PATENT DOCUMENTS

| | | | | |
|---|---|---|---|---|
| 2,249,433 A | * | 7/1941 | Johnb | B65H 75/4431 242/395 |
| 2,775,418 A | | 12/1956 | Cadman | |
| 3,747,255 A | * | 7/1973 | Way | A01K 89/0165 43/27.4 |
| 4,657,203 A | * | 4/1987 | Crawford | B65H 75/14 242/586 |
| 5,915,639 A | | 6/1999 | Farris | |
| 5,921,492 A | * | 7/1999 | Bauer | A01K 89/016 242/298 |
| 6,513,743 B1 | * | 2/2003 | Perkins, Jr. | A01K 89/057 242/295 |
| 8,480,021 B1 | | 7/2013 | Sauk | |

(Continued)

FOREIGN PATENT DOCUMENTS

| | | | | |
|---|---|---|---|---|
| DE | 212012000232 U1 | * | 10/2014 | B21C 47/323 |
| GB | 2383576 A | * | 7/2003 | A63H 27/002 |

*Primary Examiner* — Emmanuel M Marcelo
(74) *Attorney, Agent, or Firm* — Binita J. Singh; Bold IP, PLLC

(57) ABSTRACT

An improved and efficient ice-fishing tip-up spool having a generally cylindrical shape comprising an arbor configured within a first side wall and a second side wall, wherein the arbor has a diameter larger than conventional ice fishing tip-up spools. The larger arbor on the improved and efficient spool decreases the amount of fishing line required to have a full spool which can be achieved with less than 100 feet of fishing line. The large arbor spool also comprises a handle which is integrated onto the second wall and makes the spooling and re-spooling quicker in combination with the larger arbor as the fishing line spooled on per revolution is more than the fishing line spooled on per revolution by conventional ice fishing tip-up spools.

19 Claims, 4 Drawing Sheets

(56) References Cited

U.S. PATENT DOCUMENTS

| | | | |
|---|---|---|---|
| 8,919,690 B1 | 12/2014 | Fromm | |
| 9,670,032 B1* | 6/2017 | Watkins | B65H 75/22 |
| 2002/0195511 A1* | 12/2002 | Heesch | A01K 89/0111 |
| | | | 242/322 |
| 2009/0250542 A1* | 10/2009 | Kirkpatrick | A01K 97/06 |
| | | | 242/322 |
| 2010/0181406 A1* | 7/2010 | Kang | A01K 89/0162 |
| | | | 242/267 |
| 2011/0240791 A1* | 10/2011 | Lindley | B65H 75/28 |
| | | | 242/609 |
| 2014/0367506 A1 | 12/2014 | Hancock | |
| 2019/0150417 A1* | 5/2019 | Semons | A01K 89/01931 |

* cited by examiner

LARGE ARBOR ICE FISHING TIP-UP SPOOL

CROSS REFERENCE TO RELATED APPLICATION

This application claims benefit of U.S. Provisional Application No. 62/991,245 filed on Mar. 18, 2020, which is incorporated by reference in its entirety.

TECHNICAL FIELD

The overall field of this invention is directed to fishing reels, and more particularly to a spool for ice-fishing with a tip-up.

BACKGROUND

Ice fishing is a great way to go outdoors and enjoy the sport of fishing in the winter where the lakes freeze over. In order to ice fish, the right equipment will make the sport more enjoyable. A tip-up is one such equipment that ice fishing enthusiasts use. A tip-up is a tool that allows anglers to suspend a piece of bait at a set depth through a hole drilled in the ice. Once a fish strikes the bait, a spring-loaded flag will pop-up (tip-up) to signal the angler that a fish has taken their bait. Tip-ups allow ice fishermen to fish multiple holes at the same time and fish various depths at once. There are different kinds of tip-ups to choose from, however each one will need a spool that connects to one end of the tip-up. Most, if not all, tip-ups are designed so that the line spool is underwater when the tip-up is set up. The fishing line is wound onto the spool and it holds the line. Essentially, in one such tip-up design, a shaft holds the spool on one end, and the other end has the trip bar which is mounted to the flagpole that springs up. The line will run from the spool down into the water. There is some triggering mechanism that causes the flagpole to spring up when the fish takes the bait.

Current methods of putting the line on the spool involves manually winding the line onto the arbor of the spool or using a setup involving a drill that rotates the spool while manually holding the line so it winds onto the arbor. This is generally a tedious and time-consuming process. The arbor is the section of the spool onto which the line is wound on. The arbors will hold approximately 400 feet to 600 feet of line and the spools will operate at greater efficiency when near full. When the fish catches the bait, it will run the line either till the end of the line on the spool or when the fisherman stops the line from running. In either case, the line will need to be respooled back on to the spool. Respooling the line is time consuming and inefficient. Thus, there remains a need for an improved and efficient spool for tip-up ice fishing.

Hence, there remains a need for an improved and more suitable device that overcomes the above-described problems associated with most available spools and solutions specific for ice-fishing.

SUMMARY

Accordingly, the present disclosure recognizes the unsolved need and provides an improved and more suitable spool with respect to ice-fishing. It is the object of the present disclosure to provide a spool that allows greater speed of retrieval of the line once a fish catches and runs the line. It is also the object of the present disclosure to provide for a spool which reduces the amount of line required to be spooled to achieve a full spool. Further, it is also the object of the present disclosure to provide for a spool that improves efficiency and time of spooling and subsequent respooling of the line on to the spool. Additionally, another object of the present disclosure is to provide for a spool that lowers the opportunity of the line snagging or getting caught on submerged objects when the fish starts to run the line. Thus, the disclosure provides a spool for an ice fishing tip-up that encompasses several benefits into one device.

A large arbor spool, according to one or more non-limiting embodiments, is adapted to be connected to a conventional shaft, more specifically an ice fishing tip-up shaft, in order to promote efficiency by embodying the improved principles of design and construction of the present invention. The large arbor spool of the present invention is generally of a cylindrical structure comprising an arbor which is constructed between two side walls, a first side wall and a second side wall. The arbor of the cylindrical structure has a diameter larger than most conventional spools used with ice fishing tip-ups. The large arbor spool further comprises a knot hole configured on the arbor of the cylindrical structure; a set screw opening configured on the arbor of the cylindrical structure; a handle configured on the second side wall of the cylindrical structure; a securing hole configured on the first side wall of the cylindrical structure; and a recessed portion with an opening configured on the second side wall.

The presently disclosed large arbor spool according to one or more non-limiting embodiments is further described in the attached drawings and detailed description below.

DETAILED DESCRIPTION

Figure 1A:
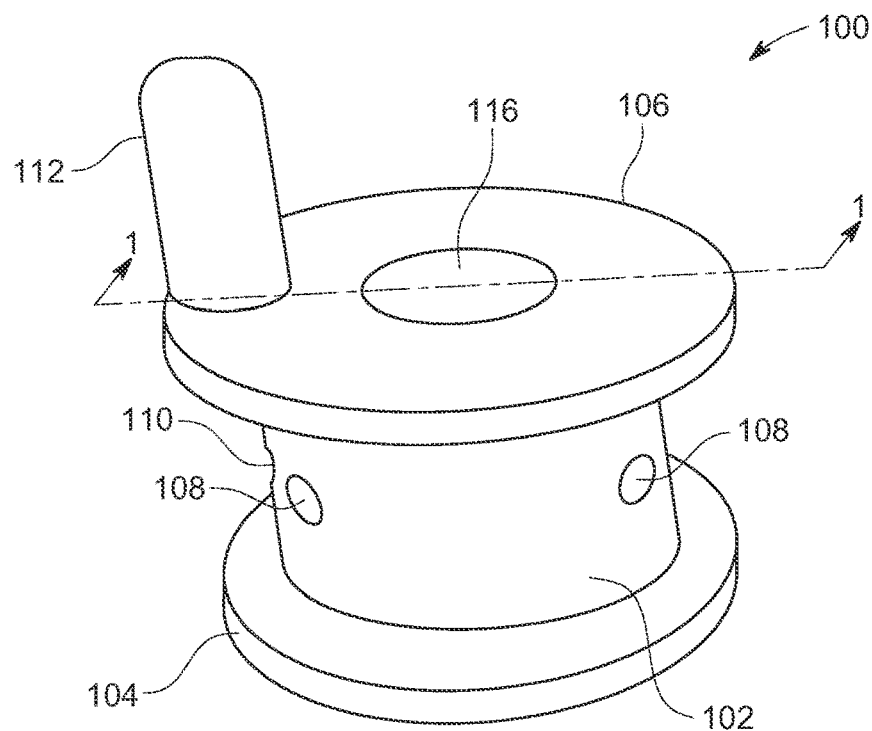
FIG. 1A illustrates a side perspective view of an embodiment of a large arbor spool according to the present invention.

In the Summary above, in this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

The following description provides preferred exemplary embodiments only, and is not intended to limit the scope, applicability, or configuration of the invention. The following description of the preferred exemplary embodiment will provide those skilled in the art with an enabling description for implementing a preferred exemplary embodiment of the invention. It shall be understood that various changes may be made in the function and arrangement of elements without departing from the scope of the invention as set forth in the claims.

The spool as disclosed features an arbor with a larger diameter. This larger arbor feature is not present on currently available spools for an ice fishing tip-up. The larger arbor ice fishing tip-up spool may completely replace existing spools on currently available and any future ice fishing tip-ups. The larger arbor ice fishing tip-up spool will be referred to as a large arbor spool for the remainder of the document herein for brevity. It is within the contemplation of the invention that the large arbor spool of the present invention may be attached with the same components from existing ice fishing tip-up spools with smaller arbors or may require slightly different hardware to make the replacement. It is also within the contemplation of this invention, that an ice fishing tip-up may be pre-attached to the larger arbor spool of the present invention.

With reference to the drawings, and in particular to the FIGS. 1A to 1C, a new ice-fishing spool embodying the principles and concepts of the present invention and generally designated by the reference numeral 100 and referred to as a large arbor spool will be described.

Figure 1B:
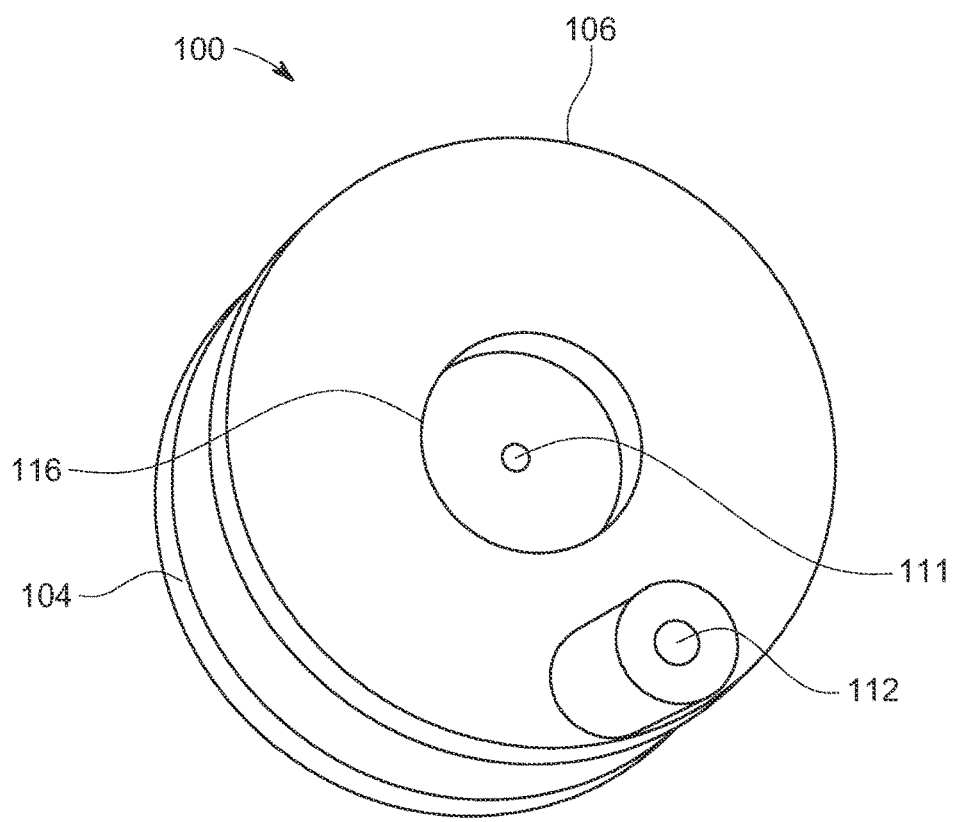
FIG. 1B illustrates a top perspective view of the large arbor spool.
Figure 1C:
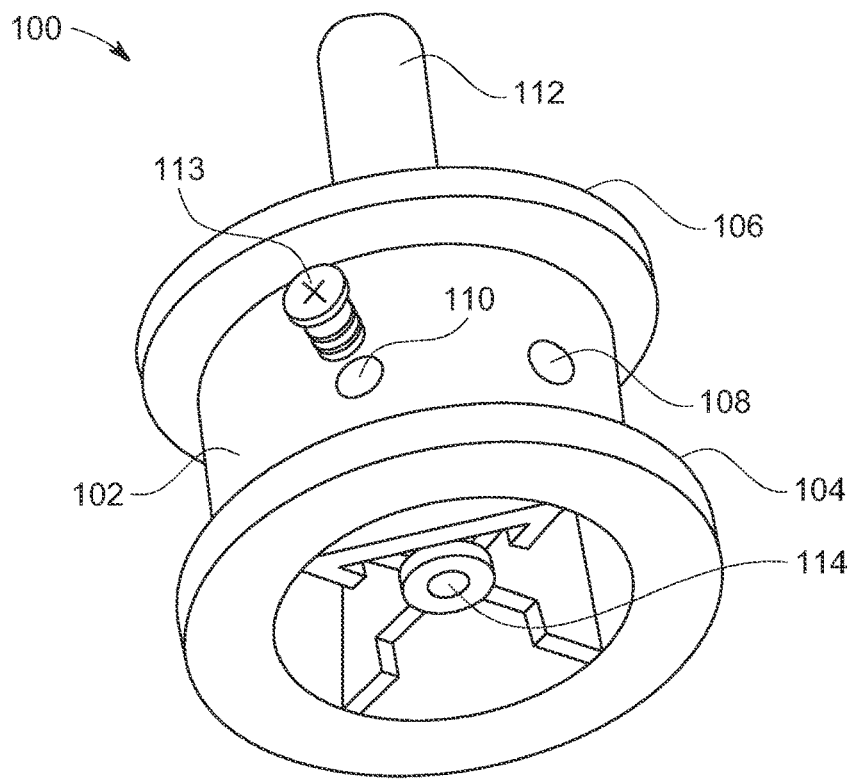
FIG. 1C illustrates a bottom angled view of the large arbor spool.

As best illustrated in FIGS. 1A through 1C, the large arbor spool 100 is generally of a cylindrical structure and comprises of an arbor 102 which is conventionally constructed between two side walls, a first side wall 104 and a second side wall 106. The large arbor spool 100 further comprises a knot hole 108 configured on the arbor 102, a set screw opening 110 configured on the arbor 102, a handle 112 configured on the second side wall 106, a securing hole 114 configured on the first side wall 104, and a recessed portion 116 on the second side wall. The large arbor spool 100 is configured to be connected to an ice fishing tip-up having a drive shaft. A non-limiting example of an ice fishing tip-up which can be connected to the large arbor spool 100 is a tip-up having an ⅛-inch drive shaft, which is the portion of the ice fishing tip-up that connects to a spool. FIG. 1A is a side perspective view, FIG. 1B is a top perspective view, and FIG. 1C is a bottom angled view. The large arbor spool of the present disclosure may be made of and not be limited to plastic, brass, iron, silver, or a combination thereof.

Figure 4A:
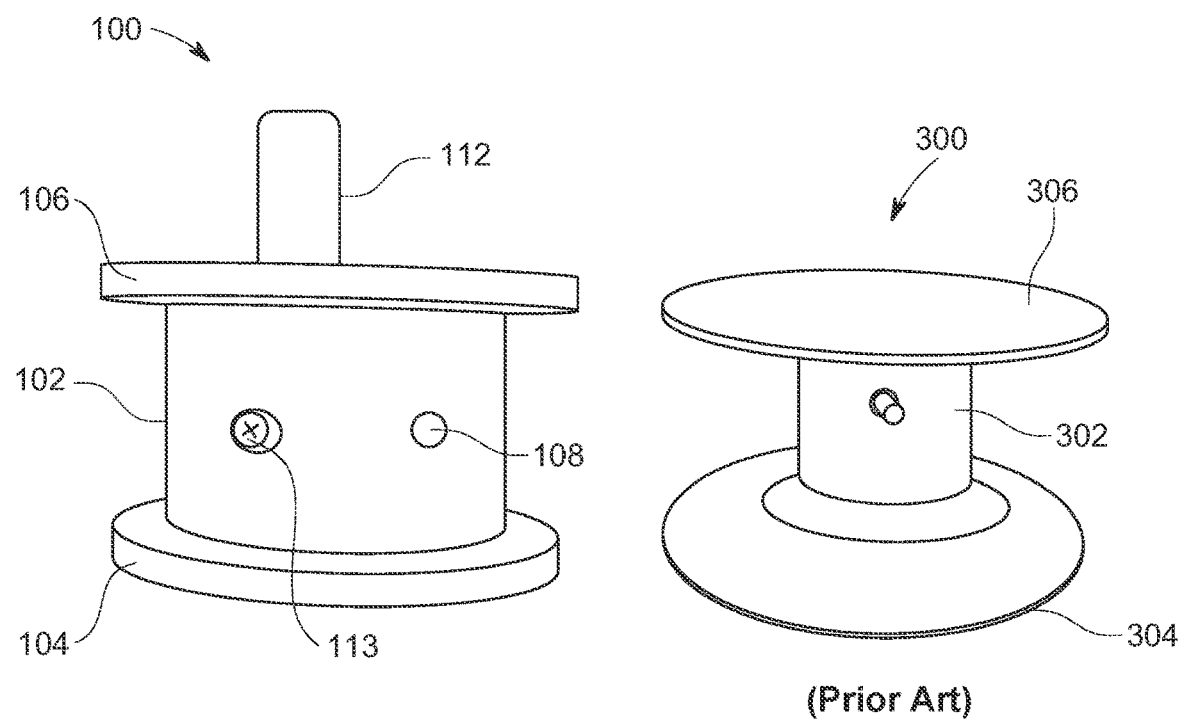
FIG. 4A illustrates a side-by-side comparison of the large arbor spool adjacent a prior art spool.
Figure 4B:
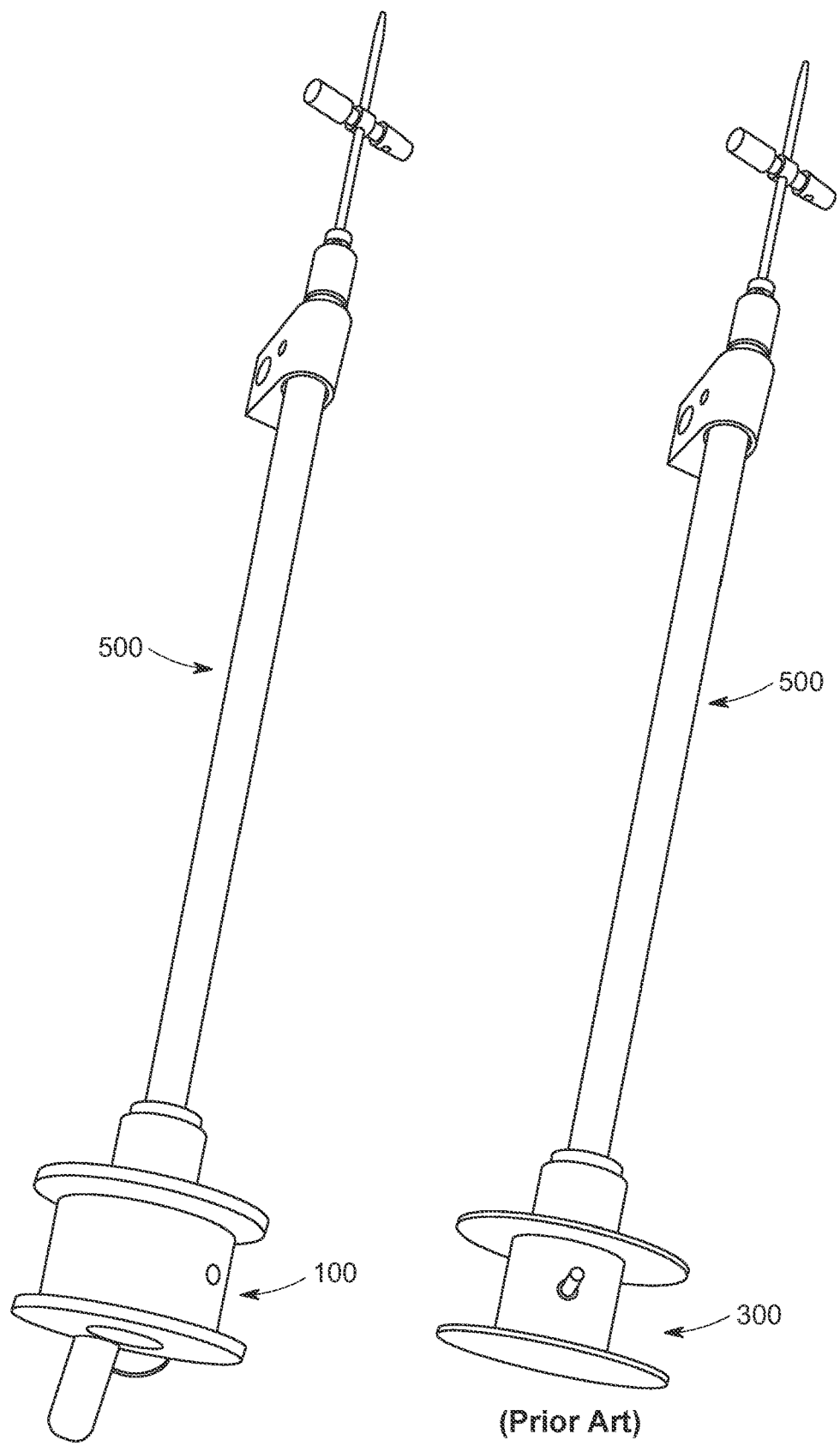
FIG. 4B illustrates the large arbor spool and the prior art spool on similar ice-fishing tip-ups.

In referring to FIGS. 4A and 4B, the large arbor spool 100 of the present invention is shown with one exemplary embodiment of a prior art spool, such as a small arbor spool 300. FIG. 4A illustrates the large arbor spool 100 and the small arbor spool 300 in a side-by-side comparison for the purposes of demonstrating the distinctions. FIG. 4B illustrates each of the large arbor spool 100 and the small arbor spool 300 on an identical ice fishing tip-up 500, again for the purposes of demonstrating the distinctions and to show that the large arbor spool 100 can be placed on existing ice-fishing tip-ups. Small arbor spool 300 is very similar in design and function to most other currently existing spools for ice fishing tip-ups. Small arbor spool 300 has an arbor 302 disposed between two side walls, 304 and 306. The arbor 302 on the small arbor spool 300 has a small diameter compared with the large arbor spool 100. The small diameter of the arbor 302 on the small arbor spool 300 thus makes the distance from the arbor 302 to an edge of the side walls 304, 306 longer, which generally requires excess line to be spooled on to the small arbor spool 300. Existing spools, such as exemplified in the small arbor spool 300 generally require a line in the range of 600 feet to achieve a full spool, and a full spool is required to have a spool operate at greater efficiency. A fish pulling line from a full spool unspools more easily than a spool which is not full as the line fed out per rotation will have a specific amount of undesired friction as the diameter gets smaller and smaller as line is pulled off. Subsequently, when the line is required to be re-spooled, retrieval is slow as the line per revolution starts out with less line being respooled as the diameter is small. Because excess line is usually stored on the exemplary small arbor spool 300, in the range of 600 feet, storing excess line creates the problem of more drag and greater opportunity to snag on submerged objects or with other ice fishing tip-ups in the vicinity as the fish moves away with the line.

Now, referencing back to the presently disclosed invention, FIGS. 1A through 1C illustrate a non-limiting preferred embodiment of the large arbor spool 100. Large arbor spool 100 as described above in comparison with existing ice fishing tip-up spools (e.g., small arbor spool 300 in FIGS. 4A through 4C) is a spool for ice fishing tip-ups wherein the arbor 102 has a larger diameter than the arbor on conventional spools used for ice fishing tip-ups. As shown in FIG. 1A, the large arbor spool 100 is shown from the side. As described earlier, the large arbor spool 100 comprises of the arbor 102 wherein the arbor 102 is situated between the first side wall 104 and the second side wall 106. The arbor 102 of the large arbor spool 100 is as the name demonstrates, with a larger diameter than the diameter of the arbor of existing prior art (small arbor spool 300 shown in FIG. 4A).

With respect to the larger diameter of the arbor 102 on the large arbor spool 100, the relationship of the arbor 102 to the first side wall 104 and the second side wall 106 is also to be realized. The diameter of the arbor 102 on the large arbor spool 100 is intended to shorten the distance to an edge of the first and second side walls 104, 106 such that less fishing line is required to be spooled onto the arbor 102 of the large arbor spool 100 to achieve a full spool for efficient operation during fishing. A non-limiting example of dimensions commensurate with the above description and to further illustrate the relationship to achieve optimal fishing efficiency is described. The example dimensions may include the arbor 102 having a diameter of 1.387 inches and a diameter of the first side wall 104 and second side wall 106 each being 1.838. Thus, in this non-limiting example of the large arbor spool 100, the distance from the arbor 102 to the edge of the first and second side walls 104, 106 is 0.451 inches, and a full spool may be achieved with 50 feet of fishing line. It is to be understood that dimensions suitable for performing the present invention comprise the diameter of the arbor in the range of 1.3 inches to 1.5 inches, the diameter of each of the first and second side walls in the range of 1.7 inches to 2 inches, with the distance from the arbor to the edges of the first and second side wall in the range of 0.2 inches to 0.7 inches.

Figure 2:
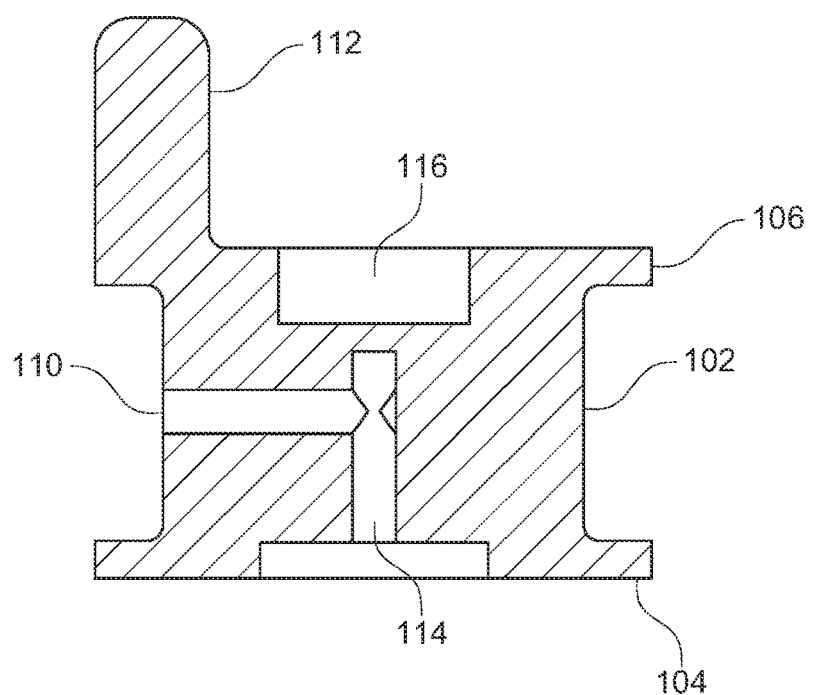
FIG. 2 illustrates a sectional view of the large arbor spool as indicated in FIG. 1A.

Even as a fish is pulling the fishing line from the large arbor spool 100 described in the above example, the large arbor spool 100 continues to unspool easily because the fishing line fed out per rotation will not have much of the undesired friction as the diameter does not get much smaller than at the start with the full spool. Subsequently, when the fishing line is required to be re-spooled, retrieval is also fast as the fishing line per revolution does not start at a significant change as the diameter of the arbor 102 is sized such that the fishing line being respooled is not more than 50 feet. FIG. 2 is an illustration that shows the large arbor spool 100 in a cross-sectional view taken at line 1-1 of FIG. 1A to provide a clearer visual of the arbor 102 and the first side wall 104 and the second side wall 106 positions. With the range of dimensions of the large arbor spool 100, a full spool may be achieved with a range of 50 feet to 100 feet of fishing line.

FIG. 1A also illustrates the large arbor spool 100 comprising of the knot hole 108 which is configured through the arbor 102. The knot hole 108 is configured as a through hole such that the knot hole 108 traverses through a portion of the arbor and is substantially parallel to the first and second side walls 104, 106. The knot hole 108 is provided to conveniently put a fishing line through and securely hold an end of the fishing line onto the arbor 102 of the spool. In use, an end of the fishing line will be put through the knot hole 108 and one revolution around the arbor will be made and then a knot will be tied to secure the fishing line on to the arbor 102. An advantage of having the knot hole 108 and securing the fishing line to the large arbor spool 100 in such a manner prevents the fishing line from slipping.

Figure 3:
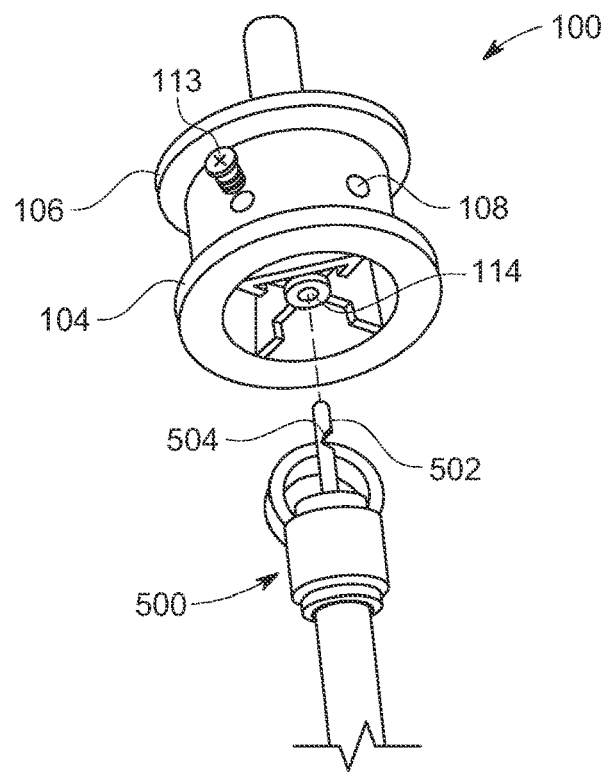
FIG. 3 illustrates the large arbor spool and an ice fishing tip-up to illustrate a securing hole which connects the large arbor spool to the ice fishing tip-up.

The large arbor spool 100 is designed to be engageable with an ice fishing tip-up. As shown in FIGS. 1A and 1C, the large arbor spool 100 comprises of the set screw opening 110. Also illustrated in FIG. 1C is the securing hole 114. Referring back to FIG. 2 which is an illustration that shows the large arbor spool 100 in a cross-sectional view taken at line 1-1 of FIG. 1A. This sectional view of the large arbor spool 100 clearly shows the set screw opening 110 and the securing hole 114 portions inside the large arbor spool 100. The securing hole 114 is located substantially at a center of the first side wall 104 and traverses through a middle of the arbor 102. As shown in FIG. 1B, the securing hole 114 traverses through the arbor 102 and opens at the second side wall 106, such as opening 111. The set screw opening 110 is configured on the arbor 102 and traverses through the arbor 102 substantially perpendicular to the securing hole 114 and opens at a point where the securing hole 114 traverses through the arbor 102. In referring to FIG. 3, the large arbor spool 100 described in this embodiment is shown being connected to an ice fishing tip-up shaft 500. The tip-up shaft 500 has an end which connects to a spool and that end includes a drive shaft 502 which has a notch 504. The drive shaft 502 is placed through the securing hole 114 on the first side wall 104 while ensuring that the notch 504 is aligned with the set screw opening 110. When the drive shaft 502 is placed through the securing hole 114, a securing means 113 such as and not limited to an Allen bolt or any other screw means is placed through the set screw opening 110. The securing means 113 is rotatably tightened and secures the tip-up 500 by pushing against to securely sit within the notch 504 on the drive shaft 502.

Alternatively, ice fishing tip-ups which do not have a notch on the drive shaft (alternate tip-up not shown) can also be secured to the large arbor spool 100. To accommodate such ice-fishing tip-ups, a drive shaft on the ice fishing tip-up is placed through the securing hole 114 and exits out of the opening 111 in the second side wall 106. The drive shaft is secured by a securing means, such as and not limited to a nut, that fits over and secures the drive shaft at the second side wall 106. As clearly shown in FIG. 1B, the opening 111 through which the drive shaft exits out of the large arbor spool 100 is within the centrally placed recessed portion 116 on the second side wall 106. The recessed portion 116 is configured into the second side wall 106 with the opening 111 such as to accommodate the portion of the tip-up securing pin and the nut placed to secure the tip-up to the large arbor spool 100 and ensures no parts are sticking out to cause injury or damage. The recessed portion 116 has a depth and a width that are measured to at least accommodate the tip-up end and securing means. A non-limiting range of the depth and the width can be 0.130 to 0.280 and 0.5 inches to 0.750 inches, respectively.

Large arbor spool 100 also comprises of the handle 112 which is integrated to an outside surface of the second side wall 106, which is opposite the arbor 102. The handle is preferably integrated to the second side wall 106 as one piece and is placed off center so as to allow the smooth revolving motion of the large arbor spool 100. The handle 112 extends outward from the second side wall 106 and is substantially perpendicular to the second side wall 106. The handle 112 extends outward and has a height that is suitable for a user to hold and rotate the large arbor spool 100 for spooling and re-spooling a fishing line. A non-limiting example of a height of the handle 112 can be 0.750 inches with a range of 0.5 inches to 1 inch.

Accordingly, the present description provides one or more embodiments for a large arbor spool with several advantages and benefits. It may be an advantage because the larger arbor creates a larger diameter decreasing the amount of line required to have a full spool. For many fishing scenarios, less than 200 feet of line is required, and not the 600 feet often required for capacity on existing spools. Respooling the extra line is inefficient, time consuming, and an unnecessary task. Spools operate at greater efficiency when near full. Essentially, with this large arbor spool, a full spool is achieved with 50 feet to 100 feet of fishing line and therefore without putting excess line on the spool. Because the spool diameter remains large even when the spool is near empty, it retains the mechanical advantage throughout its operational range. It takes less pulling force per unit of line to draw out and rewinds line at a much higher rate as well. The large arbor spool provides a mechanical advantage in that more line can be drawn with one turn of the spool, or conversely, there is smaller resistance to a small amount of line being drawn. Therefore, less resistance to the line being drawn out is critical to the fish not feeling the line, giving the fish greater opportunity to be hooked.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims.

Thus, the description is to be regarded as illustrative instead of restrictive of the present invention.

What is claimed is:

1. A large arbor spool having a cylindrical structure, comprising:
   an arbor and a first side wall and a second side wall, wherein the arbor is configured between the first side wall and the second side wall, wherein a diameter of the arbor is such that less than 100 feet of a fishing line achieves a full spool;
   a knot hole configured on the arbor;
   a set screw opening configured on the arbor;
   a handle configured on the second side wall, wherein the handle extends perpendicular to the second side wall on a side opposite the arbor; and
   a securing hole configured on the first side wall.

2. The large arbor spool of claim 1, wherein the securing hole is configured through a center of the first side wall and extends into the arbor.

3. The large arbor spool of claim 2, wherein the set screw opening configured on the arbor traverses through the arbor toward the securing hole in the arbor, and the set screw opening is substantially perpendicular to the securing hole, such that the set screw opening opens to the securing hole.

4. The large arbor spool of claim 3, wherein the set screw opening accommodates a screw that traverses through to the securing hole.

5. The large arbor spool of claim 1, wherein the securing hole is configured through a center of the first side wall and traverses through the arbor to an opening located centrally on the second side wall.

6. The large arbor spool of claim 5, wherein a recessed portion is configured centrally on the second side wall, wherein the opening in the second side wall is centrally located in the recessed portion.

7. The large arbor spool of claim 6, wherein the recessed portion has a width and a depth to accommodate a fastener which is positioned through the opening.

8. The large arbor spool of claim 1, wherein the handle is offset on the second side wall.

9. The large arbor spool of claim 8, wherein a distance between the arbor and an edge of each of the first side wall and the second side wall is in the range of 0.2 inches to 0.7 inches.

10. The large arbor spool of claim 1, wherein the diameter of the arbor is between 1.3 inches to 1.5 inches.

11. The large arbor spool of claim 1, wherein the knot hole is configured as a through hole on the arbor, such that the knot hole traverses through a side of the arbor and is substantially parallel to the first and second side walls, and an end of a fishing line is inserted through the knot hole and wrapped at least once around the arbor to secure the fishing line.

12. A larger arbor spool having a cylindrical structure, comprising:
   an arbor and a first side wall and a second side wall, wherein the arbor is configured between the first side wall and the second side wall, wherein a diameter of the arbor is such that less than 100 feet of a fishing line achieves a full spool;
   a knot hole configured on the arbor, wherein the knot hole traverses through a side of the arbor;
   a securing hole configured on the first side wall, wherein the securing hole is configured through a center of the first side wall and traverses through the arbor;
      a handle configured on the second side wall, wherein the handle is configured on the second side wall on a side opposite the arbor, and the handle extends substantially perpendicular to the second side wall; and
   a set screw opening configured on arbor, wherein the set screw opening configured on the arbor traverses through the arbor toward the securing hole in the arbor, and the set screw opening is substantially perpendicular to the securing hole.

13. The large arbor spool of claim 12, wherein the set screw opening traverses through the arbor and opens to the securing hole.

14. The large arbor spool of claim 13, wherein the set screw opening accommodates a screw that traverses through to the securing hole.

15. The large arbor spool of claim 12, wherein the securing hole is configured through the center of the first side wall and traverses through the arbor to an opening located centrally on the second side wall.

16. The large arbor spool of claim 15, wherein a recessed portion is configured centrally on the second side wall, wherein the opening in the second side wall is centrally located in the recessed portion.

17. The large arbor spool of claim 12, wherein the diameter of the arbor is between 1.3 inches to 1.5 inches.

18. The large arbor spool of claim 17, wherein a distance between the arbor and an edge of each of the first side wall and the second side wall is in the range of 0.2 inches to 0.7 inches.

19. The large arbor spool of claim 12, wherein the knot hole is substantially parallel to the first and second side walls, and
   an end of the fishing line is inserted through the knot hole and wrapped at least once around the arbor to secure the fishing line.

* * * * *